(12) United States Patent
Ha

(10) Patent No.: US 6,919,945 B2
(45) Date of Patent: Jul. 19, 2005

(54) ARRAY SUBSTRATE FOR LIQUID CRYSTAL DISPLAY DEVICE AND MANUFACTURING METHOD OF THE SAME

(75) Inventor: Kyoung-Su Ha, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/183,455

(22) Filed: Jun. 28, 2002

(65) Prior Publication Data

US 2003/0016309 A1 Jan. 23, 2003

(30) Foreign Application Priority Data

Jul. 18, 2001 (KR) ......................................... 2001-42993

(51) Int. Cl.[7] .......................................... G02F 1/1335
(52) U.S. Cl. ..................................... 349/114; 349/113
(58) Field of Search .......................... 349/43, 113, 111, 349/110, 139; 257/59, 72

(56) References Cited

U.S. PATENT DOCUMENTS 5,796,448 A * 8/1998 Kim ............................ 349/39
6,246,453 B1 * 6/2001 Zhang et al. ................. 349/39
6,320,636 B2 * 11/2001 Zhang et al. ................ 349/139
6,429,917 B1 * 8/2002 Okamoto et al. ........... 349/110
6,490,019 B2 * 12/2002 Lee et al. .................... 349/113
6,559,913 B1 * 5/2003 Sera ............................ 349/111
6,597,415 B2 * 7/2003 Rho et al. ..................... 349/42

* cited by examiner

*Primary Examiner*—Robert H. Kim
*Assistant Examiner*—Richard H Kim
(74) *Attorney, Agent, or Firm*—McKenna Long & Aldridge LLP

(57) ABSTRACT

An array substrate for a transflective liquid crystal display device includes a substrate, a thin film transistor having a channel, a gate electrode, a source electrode, and a drain electrode on the substrate, a first passivation layer on the thin film transistor, wherein the first passivation layer has a first contact hole exposing the drain electrode, a reflector on the first passivation layer, wherein the reflector is over the thin film transistor and has an opening corresponding to the first contact hole, a second passivation layer on the reflector, wherein the second passivation layer has a second contact hole through the opening, and a transparent electrode on the second passivation layer, wherein the transparent electrode has a hole over the channel of the thin film transistor and contacts the drain electrode of the thin film transistor through the first and second contact holes.

17 Claims, 6 Drawing Sheets

ARRAY SUBSTRATE FOR LIQUID CRYSTAL DISPLAY DEVICE AND MANUFACTURING METHOD OF THE SAME

This application claims the benefit of Korean Patent Application No. 2001-42993, filed on Jul. 18, 2001 in Korea, which is hereby incorporated by reference for all purposes as if fully set forth herein.

BACKGROUND OF THE INVENTION

1. Field of the Invention

The present invention relates to a liquid crystal display (LCD) device and more particularly, to an array substrate for a liquid crystal display (LCD) device and a manufacturing method of the same.

2. Discussion of the Related Art

In general, the LCD device is composed of two substrates, which are spaced apart and facing each other, and liquid crystal interposed between the two substrates. Each of the substrates includes an electrode and the electrodes of each substrate are also facing each other. Voltage is applied to each electrode and an electric field is induced between the electrodes. An arrangement of the liquid crystal molecule is changed by the intensity of the electric field, and the LCD device plays a picture by transmissivity of the light varying according to the arrangement of the liquid crystal molecule.

Because the LCD device is not luminescent, it needs an additional light source in order to display images. Accordingly, the LCD device has a back light behind a liquid crystal panel as a light source. An amount of light incident from the back light is controlled according to the alignment of the liquid crystal molecules to display images. The electrodes of each substrate are formed of transparent conductive material and the substrates must be transparent. The LCD device like this is called a transmissive liquid crystal display (LCD) device. Because the transmissive LCD device uses an artificial light source such as the back light, it can display a bright image in dark surroundings. However, the transmissive LCD device has high power consumption.

The reflective liquid crystal display (LCD) device has been suggested to overcome the power consumption problem of the transmissive LCD device. Because the reflective (LCD) device controls transmittance according to the arrangement of liquid crystal molecules depending on applied voltage and by irradiating light using an external light source such as ambient light or artificial light, it has a low power consumption compared with the transmissive (LCD) device. An electrode of the lower substrate is formed of conductive material, which has a high reflectance and an electrode of the upper substrate is formed of transparent conductive material to transmit the incident light.

On the other hand, the reflective LCD device includes a thin film transistor as a switching element. Amorphous silicon is widely used as an active layer of the thin film transistor because it can be uniformly formed at a low temperature over a large area. However, the amorphous silicon is sensitive to visible light. That is, when a light is absorbed into the active layer of the thin film transistor, a leakage current due to the absorbed light flows in the thin film transistor. This leakage current causes an undesirable signal in the LCD device, so that the thin film transistor cannot properly function as a switching element. Therefore, a black matrix, which shields the thin film transistor from the light, is formed on a substrate opposing the substrate having the thin film transistor facing the thin film transistor.

However, it is difficult to completely shield the light by the black matrix because accurate arrangement of the black matrix and the thin film transistor is not easy. If light is entirely shielded, the black matrix should have a larger size than the thin film transistor in consideration for alignment margin. Therefore, aperture ratio of the LCD device is reduced.

Various structures of an array substrate for a reflective LCD device are proposed in order to solve the above problem. An example of the array substrate of the conventional reflective LCD device will be described hereinafter in detail with reference to FIG. 1.

FIG. 1 shows a cross section of an array substrate of the conventional reflective LCD device. In FIG. 1, a thin film transistor "T", which comprises a gate electrode 4, an active layer 8, a source electrode 12, and a drain electrode 14, is formed on a substrate 1. The active layer 8 exposed between the source electrode 12 and the drain electrode 14 is a channel "CH" of the thin film transistor "T". The substrate 1 is made of an insulating material such as glass. A passivation layer 16 is formed on the thin film transistor "T". The passivation layer 16 is made of an organic material such as a benzocyclobutene (BCB) and an acrylic resin or an inorganic material such as silicon nitride (SiNx) and silicon oxide ($SiO_2$). The passivation layer 16 has a contact hole 18 which exposes a part of the drain electrode 14. A reflective electrode 20 is formed on the passivation layer 16. The reflective electrode 20 contacts the drain electrode 14 through the contact hole 18. The reflective electrode 20 acts as both an electrode, which drives a liquid crystal molecule, and a reflector, which reflects incident light. Here, the reflective electrode 20 covers the thin film transistor "T", so that the incident light does not get to the channel "CH" of the thin film transistor "T". And also the brightness of the LCD device improves because the reflective area becomes wider.

However, when voltage is applied to the reflective electrode 20, the reflective electrode 20 acts like another gate electrode. Therefore, the thin film transistor "T" operates abnormally due to the dual gate phenomenon.

To solve the problem, a structure of an array substrate for a reflective LCD device is suggested in U.S. Pat. No. 5,500,750. FIG. 2 is a cross-sectional view of showing a part of the array substrate for the conventional reflective LCD device illustrated in U.S. Pat. No. 5,500,750. Here, the same referenced symbols used in FIG. 1 is given to the same do part as the conventional array substrate of FIG. 1.

In FIG. 2, a light shield film 22, which is isolated electrically from the reflective electrode 20, is formed right above the thin film transistor "T" in order to shield the channel "CH" from light. Since the light shield film 22 is disconnected from the reflective electrode 20, no electric charges are created in the light shield film 22 and no electric field is induced between the light shield film 22 and the thin film transistor "T". Therefore, the thin film transistor "T" operates normally.

However, the light shield film 22 and the reflective electrode 20 should have a gap between them in order that the light shield film 22 should be disconnected with the reflective electrode 20. The width of the gap should be over at least 4 μm, which is the minimum value conventionally. Accordingly, the aperture ratio of the conventional reflective LCD device decreases by a size of the gap.

Moreover, the reflective LCD device cannot be used in a dark place because it relies on an external light source.

SUMMARY OF THE INVENTION

Accordingly, the present invention is directed to an array substrate for a transflective liquid crystal display device and a manufacturing method of the array substrate for a transflective liquid crystal display that substantially obviates one or more of problems due to limitations and disadvantages of the related art.

An advantage of the present invention is to provide an array substrate for a transflective liquid crystal display device that is used both in a transmissive mode and in a reflective mode and has no leakage current in a thin film transistor.

Another advantage of the present invention is to provide an array substrate for a reflective liquid crystal display device that has no leakage current in a thin film transistor.

Another advantage of the present invention is to provide a manufacturing method of an array substrate for a transflective liquid crystal display device that has no leakage current in a thin film transistor.

Another advantage of the present invention is to provide a manufacturing method of an array substrate for a reflective liquid crystal display device that has no leakage current in a thin film transistor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a substrate, a thin film transistor having a channel, a gate electrode, a source electrode, and a drain electrode on the substrate, a first passivation layer on the thin film transistor, wherein the first passivation layer has a first contact hole exposing the drain electrode, a reflector on the first passivation layer, wherein the reflector is over the thin film transistor and has an opening corresponding to the first contact hole, a second passivation layer on the reflector, wherein the second passivation layer has a second contact hole through the opening, and a transparent electrode on the second passivation layer, wherein the transparent electrode has a hole over the channel of the thin film transistor and contacts the drain electrode of the thin film transistor through the first and second contact holes.

In another aspect of the present invention, a method of manufacturing an array substrate for a liquid crystal display device includes forming a gate line and a gate electrode on a substrate, forming a gate insulator on the gate line and the gate electrode, forming an active layer on the gate insulator, forming an ohmic contact layer on the active layer, forming a data line, a source electrode, and a drain electrode on the ohmic contact layer, wherein the active layer between the source and drain electrodes is a channel of a thin film transistor, forming a first passivation layer on the data line, the source electrode, and the drain electrode, wherein the first passivation layer has a first contact hole exposing the drain electrode, forming a reflector on the first passivation layer, wherein the reflector covers the channel of the thin film transistor and has an opening corresponding to the first contact hole, forming a second passivation layer on the reflector, wherein the second passivation layer has a second contact hole through the opening, and forming a transparent electrode on the second passivation layer, wherein the transparent electrode has a hole over the channel.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
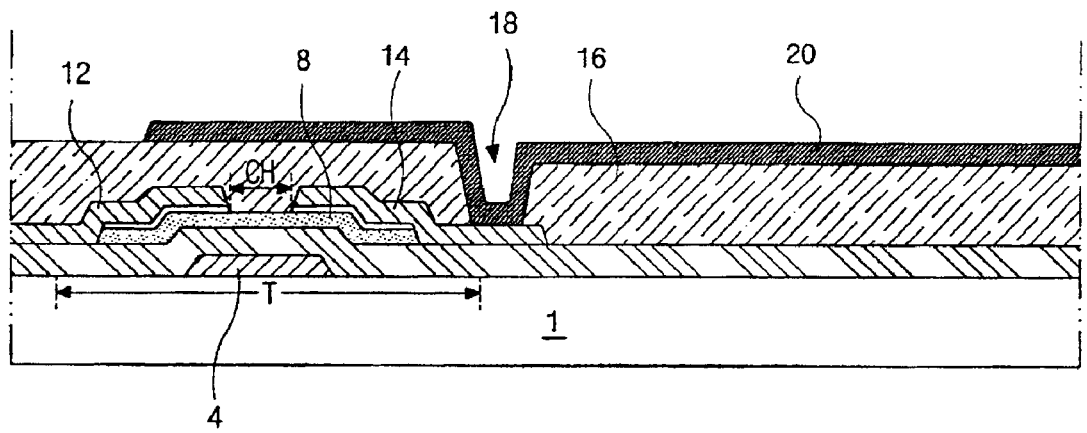
FIG. 1 is a cross-sectional view of an array substrate for a related art reflective liquid crystal display device.
Figure 2:
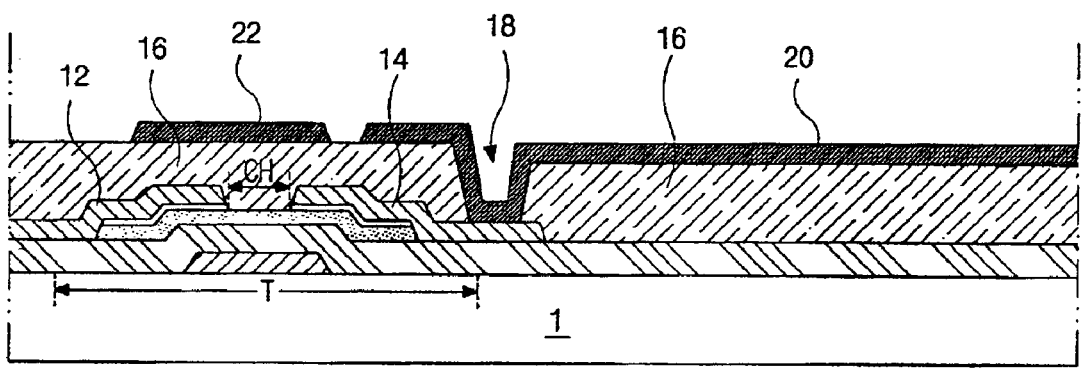
FIG. 2 is a cross-sectional view of an array substrate for another related art reflective liquid crystal display device.
Figure 3:
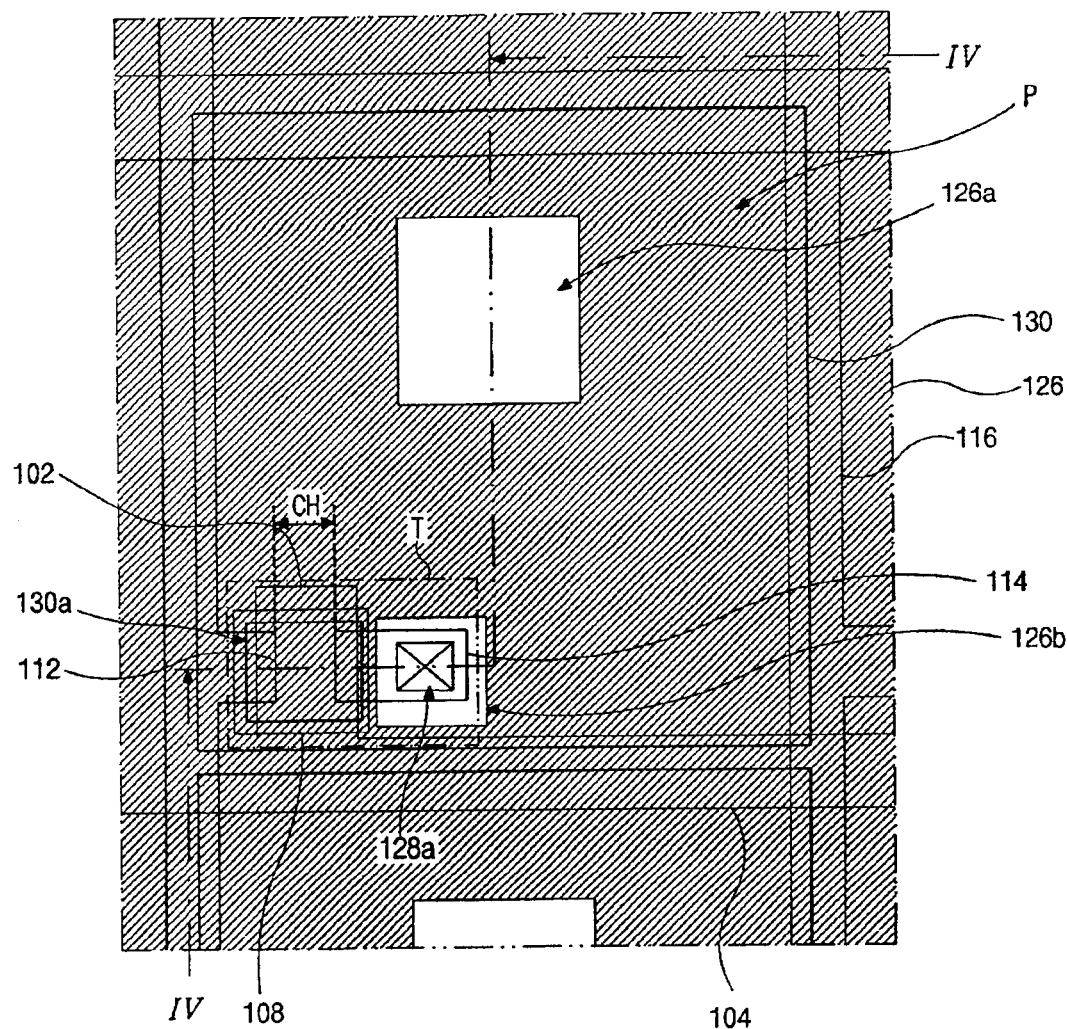
FIG. 3 is a plan view of an array substrate for a transflective liquid crystal display device according to an embodiment of the present invention.
Figure 4:
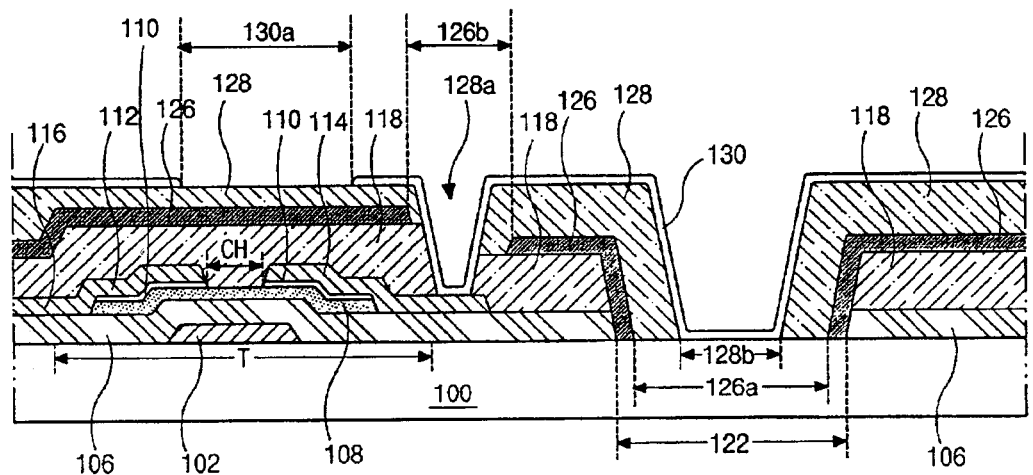
FIG. 4 is a cross-sectional view along the line IV—IV of FIG. 3.

FIG. 3 is a plan view of an array substrate for a transflective liquid crystal display (LCD) device according to an embodiment of the present invention and FIG. 4 is a cross-sectional view along the line IV—IV of FIG. 3.

In FIG. 3 and FIG. 4, a gate electrode 102 and a gate line 104 are formed on a substrate 100. The gate line 104 extends horizontally in the context of the figure and the gate electrode 102 is connected to the gate line 104. A gate insulator 106 covers the gate electrode 102 and the gate line 104, and an active layer 108 is formed on the gate insulator 106. An ohmic contact layer 110 of doped amorphous silicon is formed on the active layer 108. Next, a source electrode 112 and a drain electrode 114 are formed on the ohmic contact layer 110. The source electrode 112 is connected to a data line 116, which extends vertically in the context of the figure and crosses the gate line 104 to define a pixel region "P". The ohmic contact layer 110 lowers contact resistance between the active layer 108 and the two electrodes 112 and 114. A thin film transistor "T" includes the gate electrode 102, the source electrode 112, the drain electrode 114, and the active layer 108. The active layer 108 exposed between the source electrode 112 and the drain electrode 114 becomes a channel "CH" of the thin film transistor "T" when carriers flow between the source electrode 112 and the drain electrode 114.

A first passivation layer 118 covers the source electrode 112, the drain electrode 114 and the data line 116. The first passivation layer 118 has a first transmissive hole 122, which exposes a part of the substrate 100 through the gate insulator 106. The first transmissive hole 122 is to optimize the optical characteristics of a transmissive mode with that of a reflective mode and can be formed in only the first passivation layer 118. At this time, it is good that the first passivation layer 118 is made of a benzocyclobutene (BCB) or an acrylic resin. Next, a reflector 126 is formed on the first passivation layer 118. The reflector 126 covers the thin film transistor "T", and the reflector 126 has an opening 126b over the drain electrode 114 and a second transmissive hole 126a corresponding to the first transmissive hole 122. The reflector 126 is made of a metal that reflects light well such as aluminum (Al). A second passivation layer 128 is formed on the reflector 126. The second passivation layer 128 has a contact hole 128a exposing the drain electrode 114 and going through the opening 126b. A transparent electrode 130 is formed on the second passivation layer 128. The transparent electrode 130 is located in the pixel region "P" and is connected to the drain electrode 114 through the contact hole 128a. As the transparent electrode 130 has a hole 130a over the thin film transistor "T", the transparent electrode 130 is not formed over the channel "CH" of the thin film transistor "T". Here, the reflector 126 is not connected directly to the transparent electrode 130.

Figure 5:
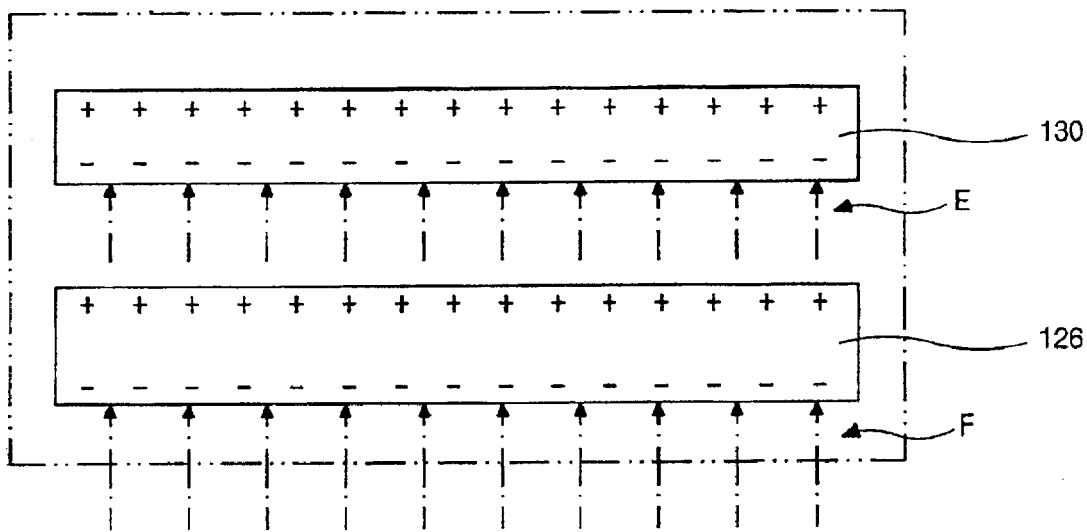
FIG. 5 is a view of illustrating an electric field induced in the case that a transparent electrode covers a thin film transistor.

If the transparent electrode 130 covers completely reflector area over the channel of the thin film transistor "T", an electric field will be induced between the transparent electrode 130 and the reflector 126 when voltage is applied to the transparent electrode 130. FIG. 5 illustrates an electric field induced in the case that the transparent electrode 130 covers the thin film transistor "T". Electric charges are induced at the reflector area over the channel "CH" of the thin film transistor "T" due to this electric field and the electric charges cause wrong operations of the thin film transistor "T".

In FIG. 5, when voltage is applied to the transparent electrode 130, electric charges are induced at the surface of the isolated reflector 126, thereby electric fields "E" and "F" are created between the transparent electrode 130 and the reflector 126 and between the reflector 126 and the channel "CH" of the thin film transistor "T" of FIG. 4, respectively. Therefore, an effect of applying gate voltage to the active layer 108 of FIG. 4 occurs even though gate voltage is not applied to the gate electrode 102 of FIG. 4, and leakage current is generated between the source electrode 112 and the drain electrode 114 of FIG. 4 due to the electric fields "E" and "F".

In the present invention, the isolated reflector 126 covers the channel "CH" of the thin film transistor "T" to prevent light incident upon the channel "CH". The transparent electrode 130 is not formed right above the channel "CH" in order to prevent a parasitic capacitance from being formed between the thin film transistor "T" and the transparent electrode 130. Therefore, leakage current is not generated in the thin film transistor "T", and the thin film transistor "T" operates normally. And also the aperture ratio of the transflective LCD device increases.

FIGS. 6A to 6D are cross-sectional views of illustrating a manufacturing process of an array substrate for the transflective liquid crystal display (LCD) device according to the present invention, and correspond to cross sections along the line IV—IV of FIG. 3.

Figure 6A:
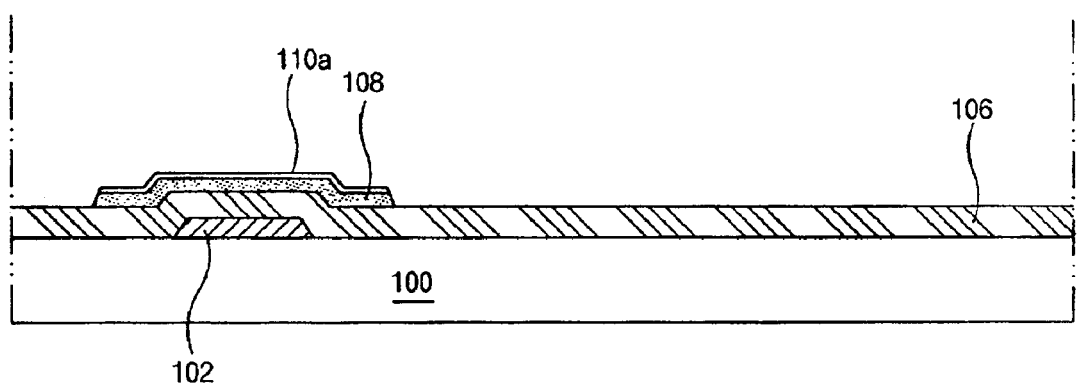
FIGS. 6A and 6D are cross-sectional views of illustrating a manufacturing process of an array substrate for the transflective liquid crystal display device according to the present invention.

In FIG. 6A, a gate electrode 102 is formed on a substrate 100 and a gate insulator 106 is formed on the gate electrode 102. Next, an active layer 108 and a doped semiconductor layer 110a are formed on the gate insulator 106 in order. The substrate 100 is made of an insulating material such as glass. The gate electrode 102 is connected to a gate line 104 of FIG. 4, which extends horizontally in the context of the figures, and the gate electrode 102 is made of a conducting material. The gate electrode 102 may be formed in a single layer including a metal such as aluminum (Al), an alloy of aluminum and neodymium (AlNd), tungsten (W), chromium (Cr), and molybdenum (Mo). And also the gate electrode 102 may be formed in a double layer of aluminum (Al) and chromium (Cr), or aluminum (Al) and molybdenum (Mo) so as to supplement the aluminum (Al), which has a low resistivity but is sensitive to chemicals. The gate insulator 106 may be made of silicon nitride (SiNx) or silicon oxide ($SiO_2$). The active layer 108 and the doped semiconductor layer 110a are formed of amorphous silicon and doped amorphous silicon, respectively.

Figure 6B:
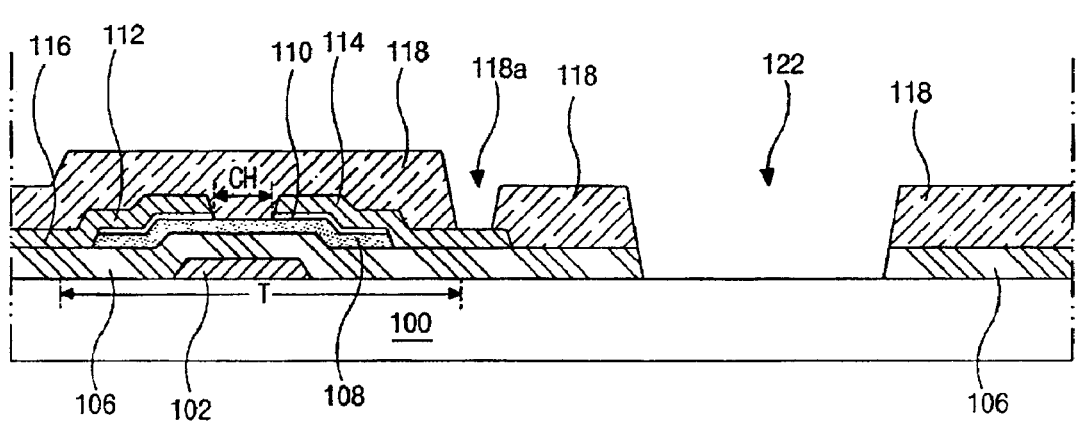

In FIG. 6B, a source electrode 112 and a drain electrode 114 are formed on the doped semiconductor layer 110a of FIG. 6A. The doped semiconductor layer 110, which is exposed between the source electrode 112 and the drain electrode 114, is etched and an ohmic contact layer 110 is completed. Next, a first passivation layer 118 is formed on the source electrode 112 and a drain electrode 114. The source electrode 112 is connected to a data line 116 of FIG. 4, which extends vertically in the context of the crosses the gate line 104 of FIG. 4 to define a pixel region "P". The source electrode 112 and the drain electrode 114 are made of the same material as the above gate electrode 102. Here, a thin film transistor "T" includes the gate electrode 102, the source electrode 112 and the drain electrode 114, and the active layer 108. The active layer 108 exposed between the source electrode 112 and the drain electrode 114 becomes a channel "CH" of the thin film transistor "T" when carriers flow between the source electrode 112 and the drain electrode 114. The first passivation layer 118 has a first transmissive hole 122, which exposes a part of the substrate 100, through the gate insulator 106. The first transmissive hole 122 can be formed in only the first passivation layer 118 or through both the first passivation layer 118 and the gate insulator 106. The first transmissive hole 122 makes a thickness of a liquid crystal layer in a transmissive region thicker than that of a liquid crystal layer in a reflective region, and so optimizes the optical characteristics of a transmissive mode with that of a reflective mode. The first passivation layer 118, also, may have a first contact hole 118a exposing a part of the drain electrode 114. The first passivation layer 118 is made of one of an organic material, such as benzocyclobutene (BCB) and acrylic resin, and an inorganic material, such as silicon nitride (SiNx) and silicon oxide ($SiO_2$).

Figure 6C:
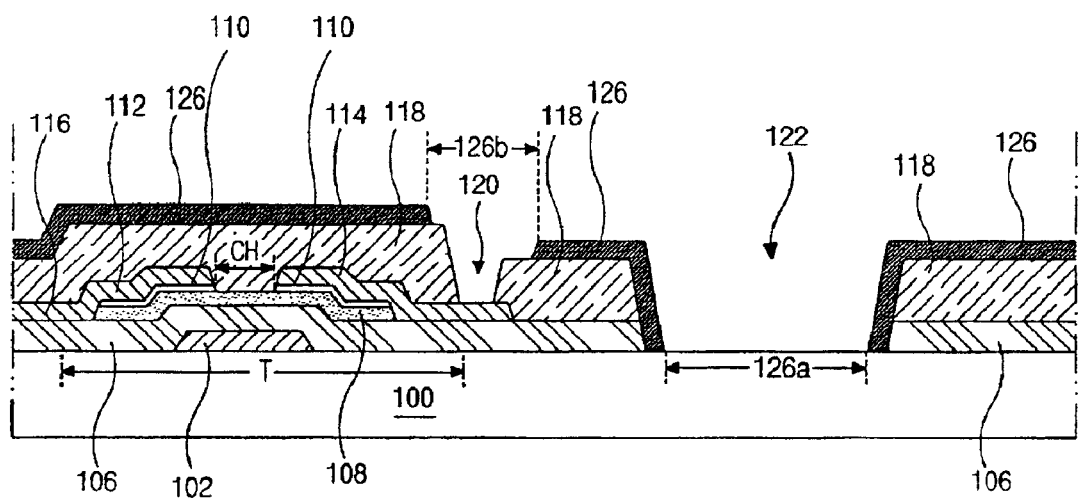

Next, in FIG. 6C, a reflector 126 is formed on the first passivation layer 118. The reflector 126 covers the thin film transistor "T", and the reflector 126 has an opening 126b over the drain electrode 114 and a second transmissive hole 126a corresponding to the first transmissive hole 122. The reflector 126 is made of a metal that reflects light well and has low resistivity such as aluminum (Al). The reflector 126 may be formed of either aluminum (Al) or an alloy of aluminum and neodymium (AlNd).

Figure 6D:
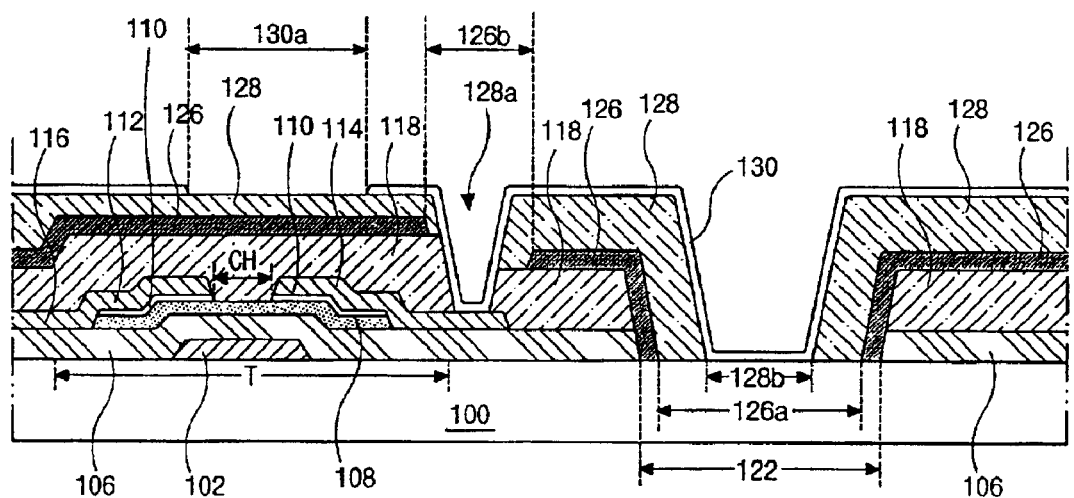

In FIG. 6D, a second passivation layer 128 is formed on the reflector 126 and a transparent electrode 130 is formed on the second passivation layer 128. The second passivation layer 128 has a second contact hole 128a exposing the drain electrode 114 and going through the opening 126b. The contact holes 120 and 128a can be formed at a time when the second contact hole 128a is formed. The second passivation layer 128 is made of one of silicon nitride (SiNx) and silicon oxide ($SiO_2$). The transparent electrode 130 is connected to the drain electrode 114 through the contact hole 128a. As the transparent electrode 130 has a hole 130a over the thin film transistor "T", the transparent electrode 130 is not formed over the thin film transistor "T". More particularly, the transparent electrode 130 is not formed substantially directly above the channel "CH" of the thin film transistor "T". The transparent electrode 130 is made of a transparent conducting material such as an indium-tin-oxide (ITO) and an indium-zinc-oxide (IZO). At this time, the reflector 126 is isolated from the transparent electrode 130.

Figure 7:
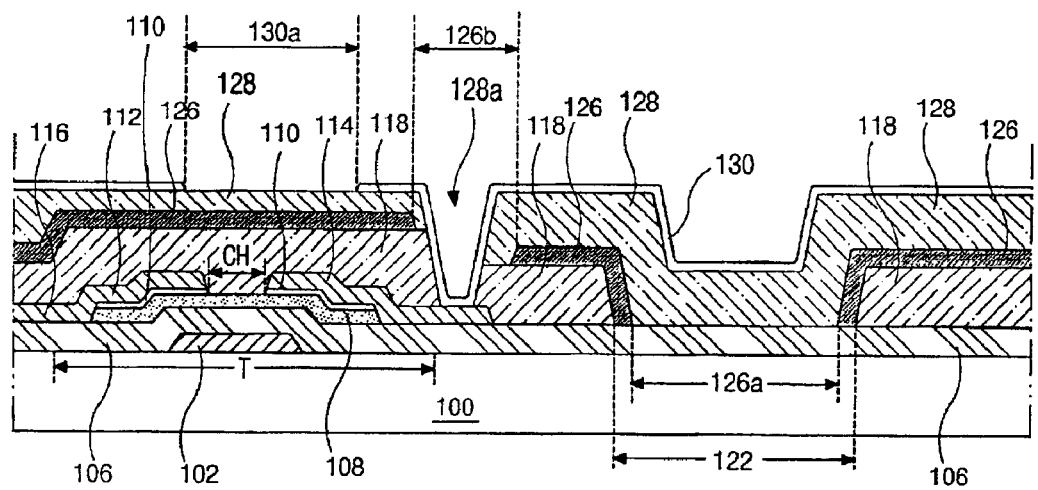
FIG. 7 is a cross-sectional view of an array substrate for a transflective liquid crystal display device according to another embodiment of the present invention.

In another embodiment of the present invention, as shown in FIG. 7, it is possible not to form the first transmissive hole 122 such that the transparent electrode 130 contacts the surface of the substrate 100 as shown in FIG. 4. In other words, the second passivation layer 128 is between the transparent electrode 130 and the substrate 100 in a region corresponding to the transmissive holes 122 and 126a. Additionally, the gate insulating layer 106 may be between the second passivation layer 128 and the substrate 100 in the region.

Figure 8:
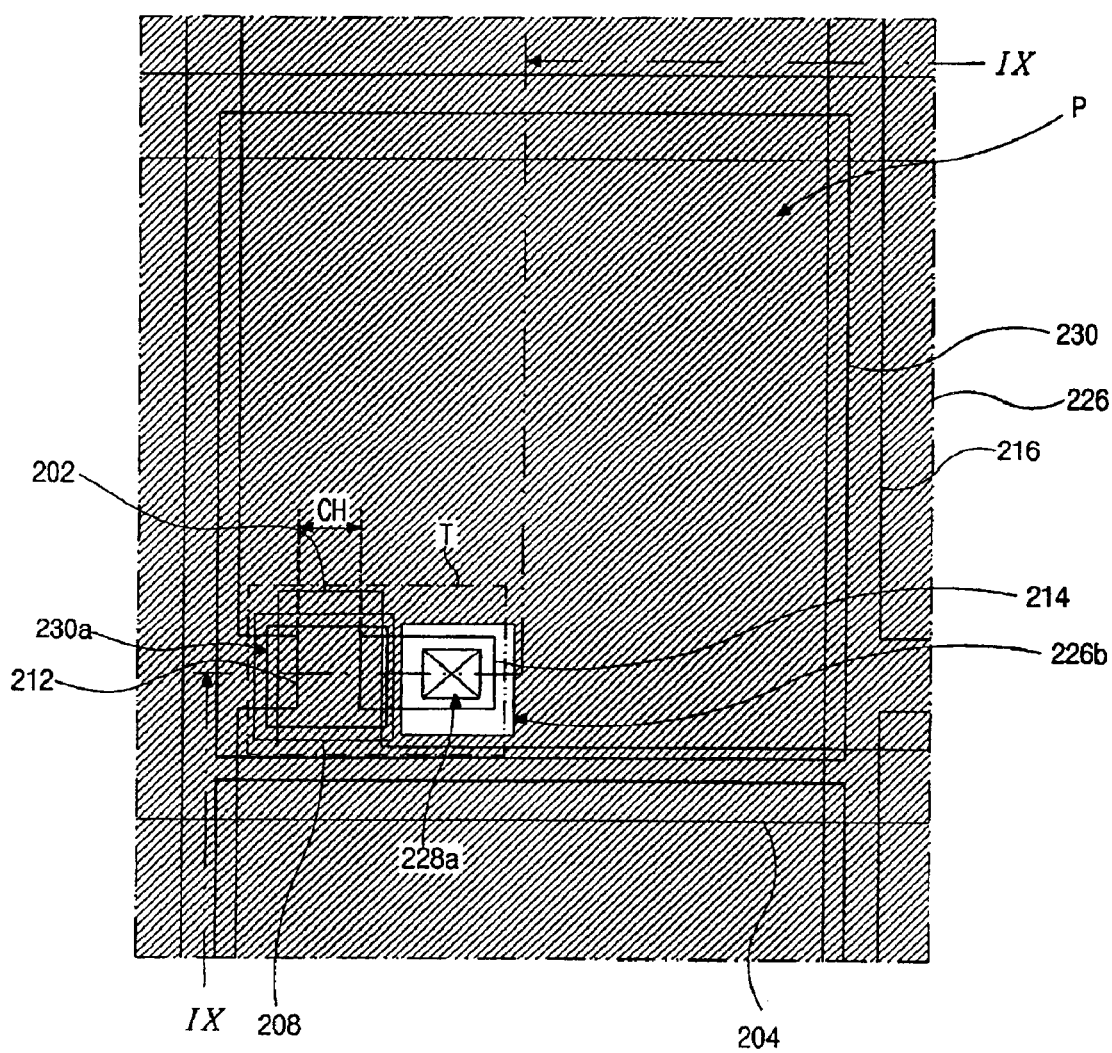
FIG. 8 is a plan view of an array substrate according to another embodiment of the present invention.
Figure 9:
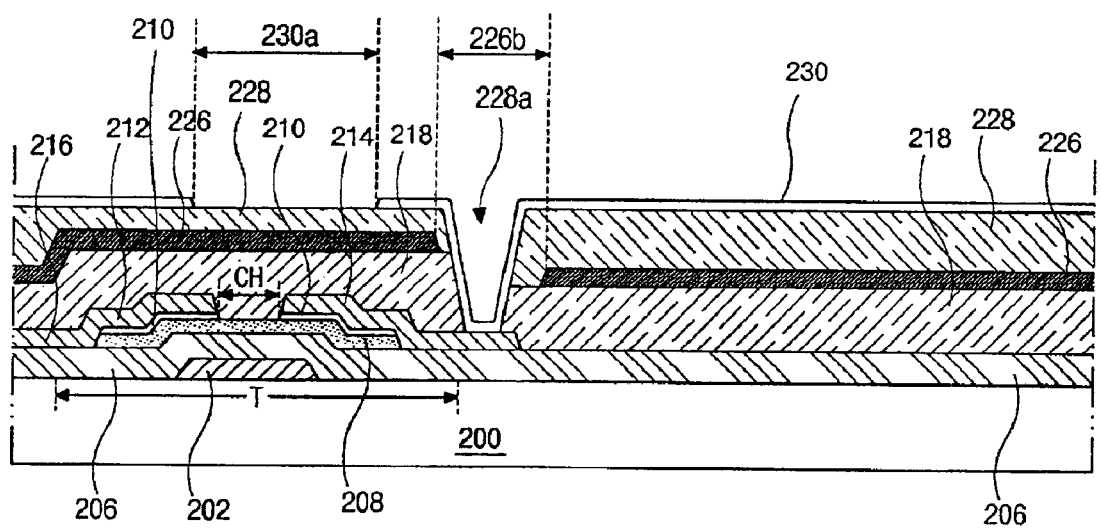
FIG. 9 is a cross-sectional view along the line IX—IX of FIG. 8.

In another embodiment, as shown in FIGS. 8 and 9, it is possible to forego providing the first transmissive hole such that an area away from the thin film transistor "T", a gate insulating layer 206 is formed on the substrate 200, a first passivation layer 218 is formed on the gate insulating layer 206; an electrically isolated reflective layer 226 is formed on the first passivation layer 218; and a second passivation layer 228 is formed on the reflective layer 226. A transparent electrode 230 covers the second passivation layer 228 and extends to a contact hole 228a over the drain electrode and contacts the drain electrode 214 through the contact hole 228a. The transparent electrode 230 has a hole 230a above the channel "CH" of the thin film transistor "T".

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a substrate;
   a thin film transistor on the substrate, the thin film transistor having a channel, a gate electrode, a source electrode, and a drain electrode;
   a first passivation layer on the thin film transistor, the first passivation layer having a first contact hole exposing the drain electrode;
   a reflector on the first passivation layer, the reflector over the thin film transistor and in a pixel region and having an opening corresponding to the first contact hole;
   a second passivation layer on the reflector, the second passivation layer having a second contact hole through the opening; and
   a transparent electrode on the second passivation layer, the transparent electrode overlapping a portion of the reflector, having a hole over the channel of the thin film transistor and contacting the drain electrode of the thin film transistor through the first and second contact holes.

2. The array substrate according to claim 1, wherein the reflector and the first passivation layer have a first transmissive hole and a second transmissive hole in, respectively.

3. The array substrate according to claim 2, further comprising a gate insulating layer on the substrate, the gate insulating layer covering the gate electrode.

4. The array substrate according to claim 2, wherein the second passivation layer has a third transmissive hole corresponding to the first and second transmissive holes.

5. The array substrate according to claim 4, wherein the transparent electrode contacts the substrate through the transmissive holes.

6. The array substrate according to claim 1, wherein the reflector is electrically isolated from the transparent electrode.

7. The array substrate according to claim 1, wherein the reflector includes one of aluminum and an alloy of aluminum and neodymium.

8. The array substrate according to claim 1, wherein the first passivation layer includes one of benzocyclobutene (BCB) and acrylic resin.

9. The array substrate according to claim 1, further comprising a gate line and a data line, the gate line and the data line crossing each other and being electrically connected to the gate electrode and the source electrode of the thin film transistor, respectively.

10. The array substrate according to claim 1, wherein the second passivation layer is of an inorganic material.

11. A method of manufacturing an array substrate for a liquid crystal display device, comprising:
    forming a gate line and a gate electrode on a substrate;
    forming a gate insulator on the gate line and the gate electrode;
    forming an active layer on the gate insulator;
    forming an ohmic contact layer on the active layer;
    forming a data line, a source electrode, and a drain electrode on the ohmic contact layer, the active layer between the source and drain electrodes being a channel of a thin film transistor;
    forming a first passivation layer on the data line, the source electrode, and the drain electrode, the first passivation layer having a first contact hole exposing the drain electrode;
    forming a reflector on the first passivation layer, the reflector covering the channel of the thin film transistor, extending into a pixel region, and having an opening corresponding to the first contact hole;
    forming a second passivation layer on the reflector, the second passivation layer having a second contact hole through the opening; and
    forming a transparent electrode on the second passivation layer, the transparent electrode overlapping a portion of the reflector, having a hole over the channel of the thin film transistor and contacting the drain electrode of the thin film transistor through the first and second contact holes.

12. The method according to claim 11, wherein the reflector and the first passivation layer have a first transmissive hole and a second transmissive hole in, respectively.

13. The method according to claim 12, wherein the second passivation layer has a third transmissive hole corresponding to the first and second transmissive holes.

14. The method according to claim 13, wherein the transparent electrode contacts the substrate through the transmissive holes.

15. The method according to claim 11, wherein the reflector is electrically isolated from the transparent electrode.

16. The method according to claim 11, wherein the reflector includes one of aluminum and an alloy of aluminum and neodymium.

17. The method according to claim 11, wherein the first passivation layer includes one of benzocyclobutene (BCB) and acrylic resin.

* * * * *